United States Patent [19]

Ma

[11] Patent Number: 5,106,003

[45] Date of Patent: Apr. 21, 1992

[54] VEHICLE TRAY TABLE

[76] Inventor: Mark Ma, 1415 Martens Dr., Hammond, La. 70401

[21] Appl. No.: 465,987

[22] Filed: Jan. 16, 1990

[51] Int. Cl.⁵ ............................ B60R 7/00; B60R 9/00
[52] U.S. Cl. .................... 224/42.42; 224/42.43; 224/42.44; 224/282; 108/44; 248/293
[58] Field of Search .............. 224/42.42, 42.43, 42.44, 224/42.46 R, 42.32, 42.35, 282, 273, 42.45 R, 311, 42.41, 320; 108/44; 211/12, 71, 81, 85, 88, 131; 248/311.2, 100, 293, 286; 296/37.7, 37.8

[56] References Cited

U.S. PATENT DOCUMENTS

| | | | |
|---|---|---|---|
| 1,964,339 | 6/1934 | Brassell | 224/311 |
| 2,818,317 | 12/1957 | Little, Jr. | 224/311 |
| 2,829,813 | 4/1958 | Sebell | 224/311 |
| 2,896,828 | 7/1959 | Banta | 224/42.46 R |
| 2,947,585 | 8/1960 | Fazio | 296/37.7 |
| 4,583,707 | 4/1986 | Anderson | 248/293 |
| 4,792,174 | 12/1988 | Shioda | 224/42.44 |
| 4,826,058 | 5/1989 | Nakayama | 224/42.44 |
| 4,830,243 | 5/1989 | Mann | 224/42.44 |
| 4,852,499 | 8/1989 | Ozois | 108/44 |
| 4,953,771 | 9/1990 | Fischer et al. | 224/42.43 |

Primary Examiner—Henry J. Recla
Assistant Examiner—Keith Kupferschmid
Attorney, Agent, or Firm—Pravel, Gambrell, Hweitt, Kimball & Krieger

[57] ABSTRACT

A tray including a flat horizontal surface, positioned within a frame, with the frame tray adaptable to be positioned atop the dashboard of a vehicle, such as an automobile. There is further provided an attachment of one end of the tray to the windshield via suction cups, and for providing a second pair of suction cups which are adjustable in height to be attachable onto the dashboard, so that the tray can be supported flat during use. There may be further included a trash bag support bracket, and holders for receiving a cup thereinto to maintain the cup in a vertically supported position on the tray.

3 Claims, 5 Drawing Sheets

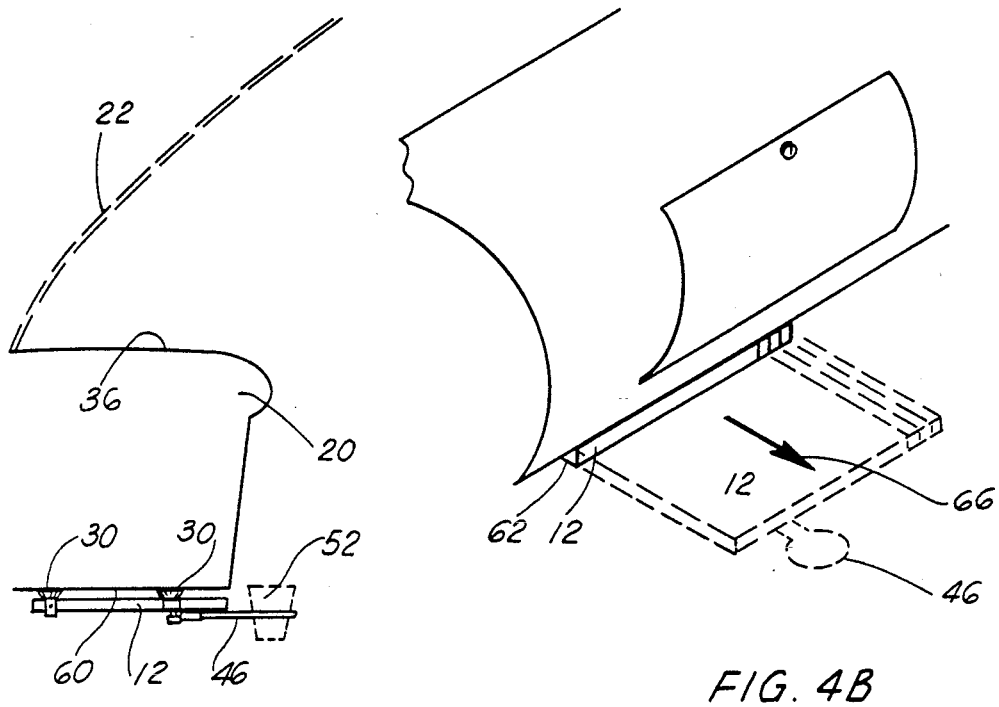
FIG. 4A
FIG. 4B
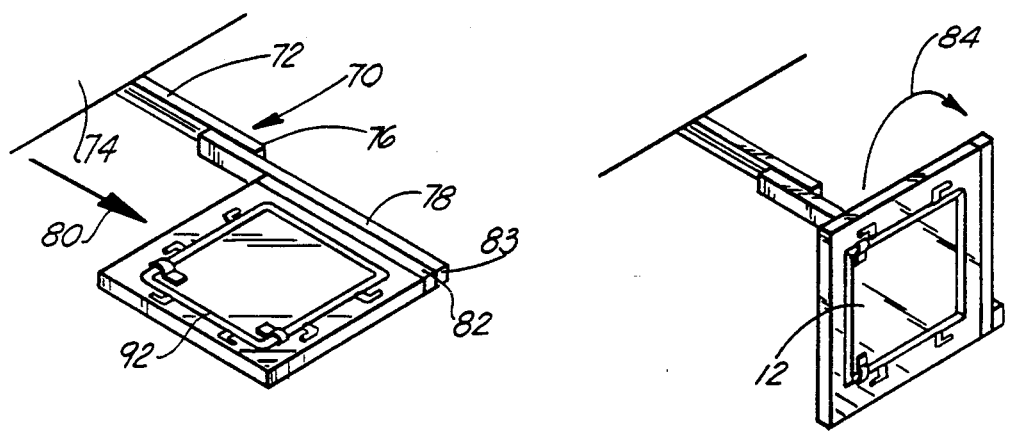
FIG. 3A
FIG. 3B

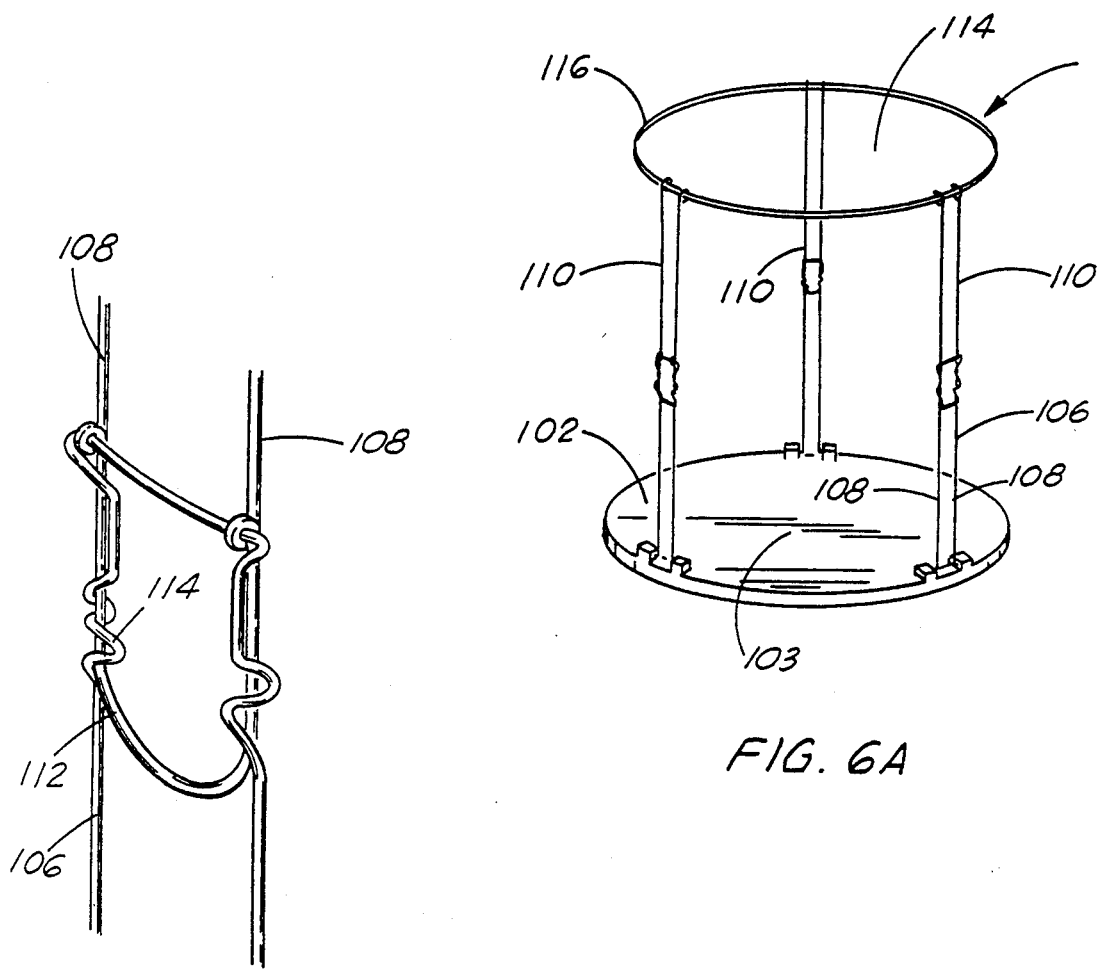
FIG. 6A
FIG. 6B
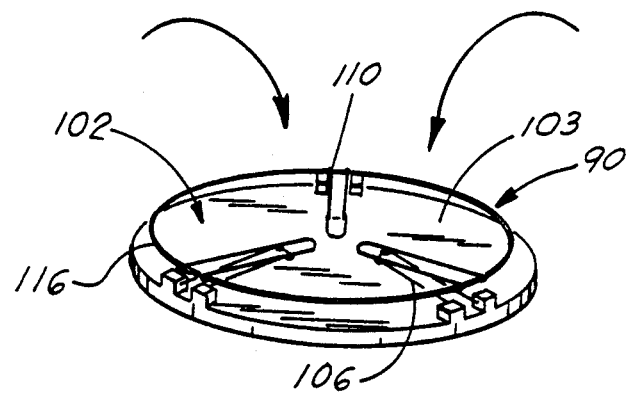
FIG. 6C 5,106,003

VEHICLE TRAY TABLE

BACKGROUND OF THE INVENTION

1. Field of the Invention

The apparatus of the present invention relates to vehicles. More particularly, the present invention relates to an apparatus which is positionable on the dash board of a vehicle, in order to enable the driver or other passengers of the vehicle to utilize the apparatus as a serving tray so that food and drink may be supported thereupon while the vehicle is being utilized.

2. General Background

In our mobile society today, individuals quite often are required to eat their meals, breakfast and lunch, "on the run", and within the confines of their automobile or or other vehicles. For example, salesman or other people are on the road a better part of the day, and often times do not have the time and convenience to stop in order to eat a meal, but simply eat while on the road. In fact, one of the more popular items in fast food outlets is the use of the drive through window, where people are able to pick up food, and either bring the food home, or, very often, eat while in route.

At the present time, there appears to be no system on the market, which would accommodate food and drink items people may wish to consume while driving. For example, under the present state of the art, if one were to want to eat a sandwich and fries and a soft drink, it is a delicate task in order to position the soft drink so that it will not topple over while the car is in motion, open the sandwich, and position other food items so that one may eat while traveling down the highway. It would be a convenience to introduce into the art, a novel type of apparatus which would enable one to have a conveniently located support surface for the food, and holders for the soft drinks, to allow one to eat and drink while in route. The apparatus of the present invention attempts to solve the problem that are confronted in the art, and introduce such improvements into the art.

SUMMARY OF THE PRESENT INVENTION

The apparatus of the present invention solves the problems in the art in a simple and straightforward manner. What is provided is a tray which include a flat, horizontal surface, positioned within a frame, with the framed tray adaptable to be positioned atop the dash board of a vehicle, such as an automobile. There would be further provided a means for attaching one end of the tray to the windshield via suction cups or the like, and for providing a second pair of suction cups which are adjustable in height to be attachable onto the dash board, so that the tray would be supported flat in use. There is further included soft drink holders which would comprise rings slidably movable from beneath the tray, so that a cup or a soft drink could be placed within the ring opening, to avoid spillage. In another embodiment of the tray, the tray would be accommodated via a framework, onto the vehicle, so that the framework would allow the tray to slide forward and down so that it would be positioned adjacent the driver. There would further be included a frame slidably movable from beneath the tray, the frame including hooks for accommodating a tray bag for disposing trash into the bag after use. In the third embodiment, the tray would simply be positioned at a point beneath the dash board, and would be able to be slid out from beneath the dash board and would be horizontally inclined to allow the placement of food thereupon and the placement of a soft drink or the like in the slidable ring members.

Therefore, it is a principal object of the present invention to provide a support surface for food and soft drinks or the like within the interior of a vehicle while the vehicle is in use;

It is a further object of the present invention to provide a removable tray attachable to a vehicle and positionable onto the dash board, so that food and other materials may be placed upon the tray and consumed while the vehicle or the like is in motion;

It is still a further object of the present invention to provide a tray adaptable to the interior of a vehicle or the like which would further include means for accommodating a soft drink in a cup or bottle to avoid spillage of the drink, and to further provide means for attaching a trash bag for dumping of trash into the bag; and It is still a further object of the present invention to provide an embodiment wherein the tray would be slidably accommodated beneath the dash board and would simply slid up into position for use, and would return to its stored away position while the apparatus is not in use.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIGS. 3A through 3D illustrate the preferred embodiment of the apparatus of the present invention which may be placed in a storage position above the windshield of the vehicle in the interior;

FIGS. 4A through 4B illustrate an additional embodiment of the apparatus of the present invention as illustrated in FIGS. 3A through 3D;

FIGS. 6A and 6B illustrate bottom and side views respectively of the drink container holder of the apparatus of the present invention; and

DETAILED DESCRIPTION OF THE PREFERRED EMBODIMENT

Figure 1:
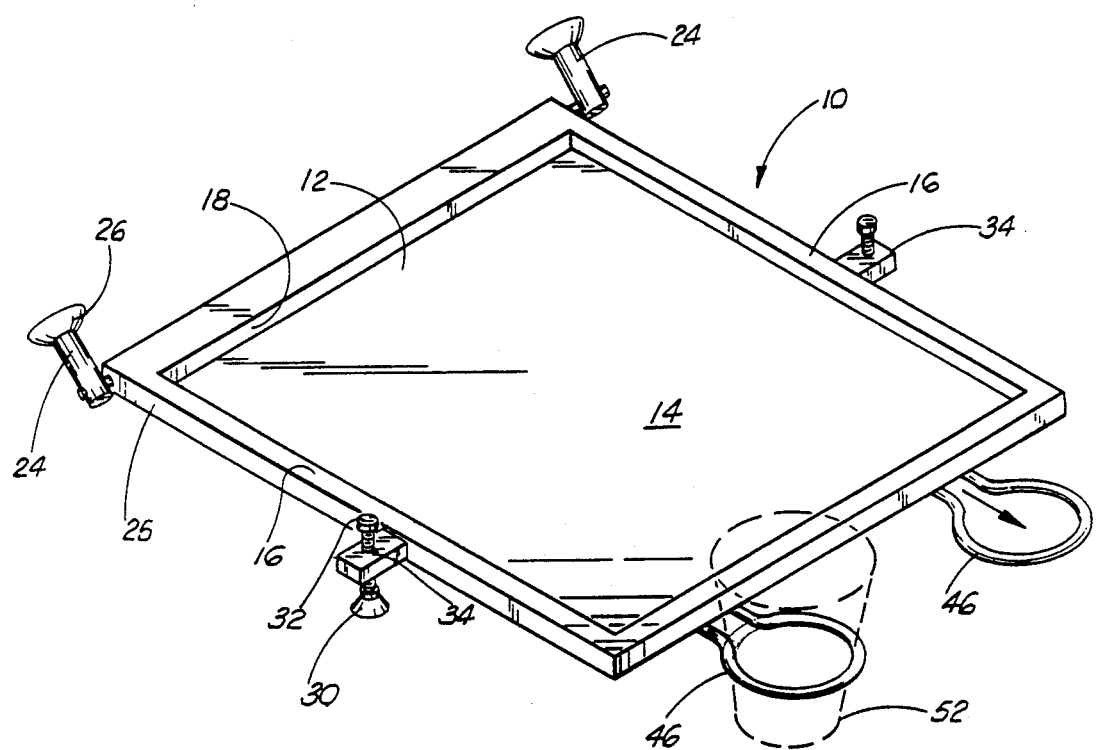
FIG. 1 illustrates an overall view of the preferred embodiment of the apparatus of the present invention.

FIGS. 1 through 6C illustrate the preferred embodiment of the apparatus of the present invention which is illustrated by the numeral 10, but which is shown in various positions within the interior of the vehicle during use. As illustrated in the overall view in FIG. 1, apparatus 10 would comprise a horizontal support surface 12 which would be constructed of a light-weight and rigid material so that food items or drink may be supported on the upper surface 14. Surface 12 would be provided with a perimeter border 16, which would be raised a distance as represented by edge 18 above surface 14, so that items placed upon surface 14 which would not have a tendency to slide off of the surface while the vehicle is in use. Perimeter border 16 would form a rectangular completely surrounding surface 14, and therefore prevent the loss of any items set thereupon.

Figure 2:
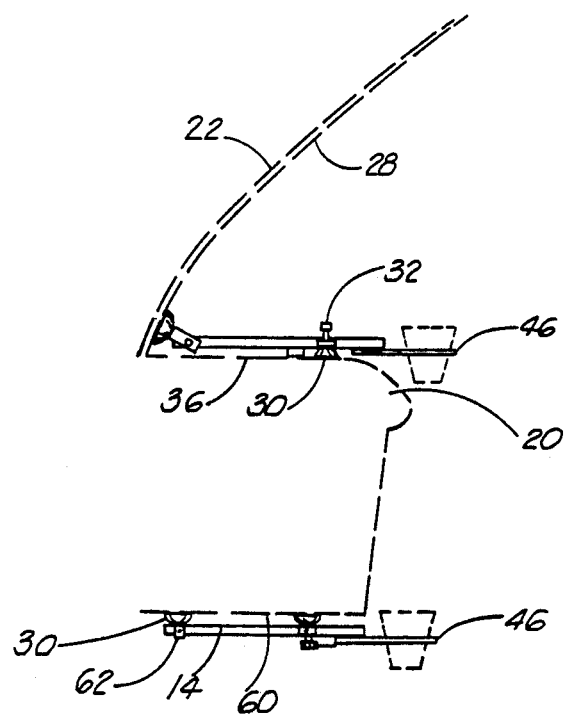
FIG. 2 illustrates a side plan view of the principal embodiment of the present invention.

As further illustrated. apparatus 10 would further comprise a means for attaching the apparatus onto a dash board 20, of an automobile, and onto the front windshield 22 of the vehicle, as illustrated in FIG. 2. As seen, the means for attachment would comprise a first pair of suction members 24 which would be attached to the edge 25 of frame 16, and would include a suction cup 26. The suction cup 26 positioned so as to be attachable to the interior surface 28 of windshield 22 as illustrated in FIG. 2. Furthermore, there would be included a second pair of suction cups 30, each of the suction cups 30, as illustrated in FIG. 1, attachable to a threadable screw member 32, threaded to an arm 34, extending from the edge 25 of frame 16, upon each of the sides of frame 16, so that each suction cup 30 is extending downward to a point lower than surface 14, the members 30 engaging the upper surface 36 of dash board 20, as illustrated in FIG. 2. The adjustability of the screw members 32 would therefore allow surface 14 to be completely well fixed in place and positioned horizontally as illustrated in FIG. 2, so that food items, etc., may be placed thereupon in the interior of the vehicle. Of course, while not in use, the suction cups would simple be popped off of the windshield 22 and the dash board surface 36, and could be stored either in the trunk of the car, or in another convenient storage place.

Figure 5A:
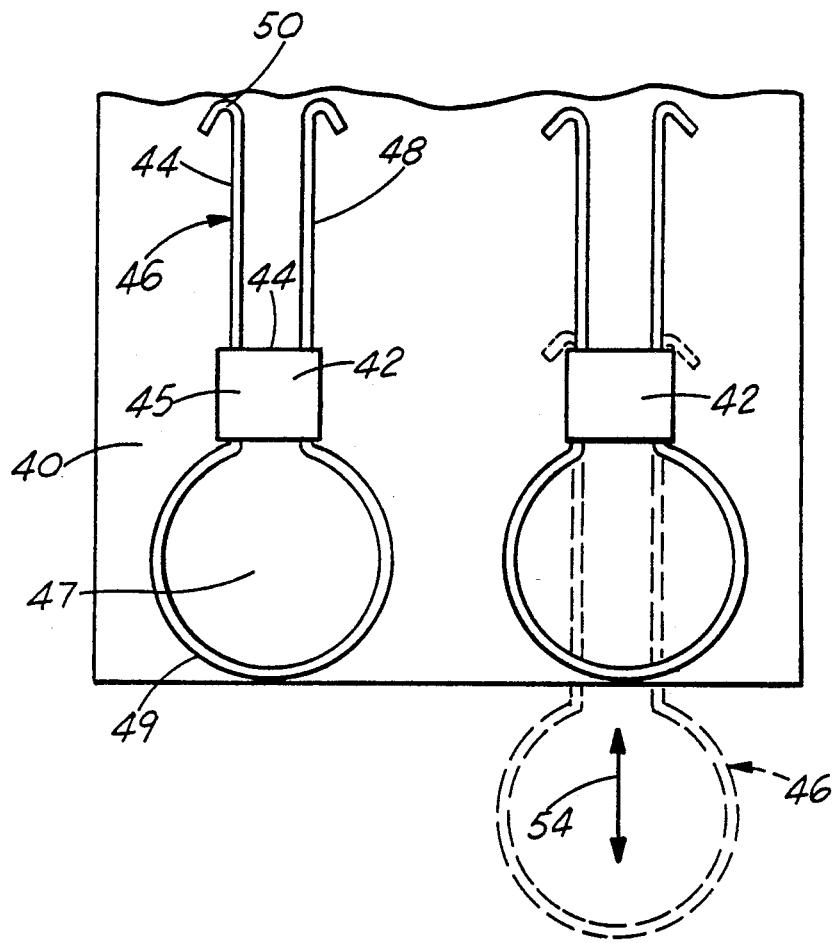
FIGS. 5A through 5B illustrate side and plan views respectively of an additional embodiment of the apparatus of the present invention.
Figure 5B:
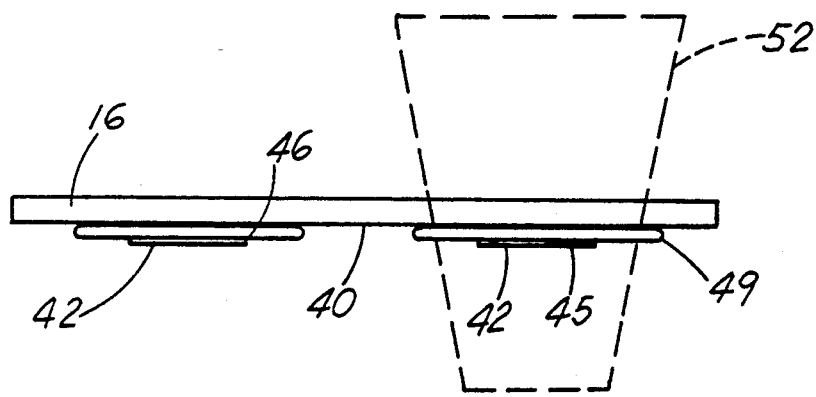

Further as seen in this particular embodiment, as illustrated in FIGS. 5A and 5B, there is illustrated in FIG. 5A the undersurface 40 of surface 14, with the undersurface 40 of surface 14 including a pair of bracket clips 42 attached to the undersurface 40 of surface 14 with bracket clips 42 having a space 44 between the lower surface 45 of each of the clips 42, and the underside 40 of surface 14. The space 44 would slidably accommodate a means 46 for holding a soft drink or a cup within a substantially circular space 47 of means 46 as illustrated. Holder means 46 would further comprise a pair of arm members 48 which would be in substantial parallel relationship, and would have their first end a circular housing portion 49, which would define holder space 47 therewithin, and on their second end a pair of hook members 50, which be hooked outwardly as illustrated in FIG. 5A.

When apparatus 10 would be positioned onto the vehicles illustrated in FIGS. 1 and 2, each of the holders 46 could be slid from its first storage position as seen in 5A, to its second use position as seen in phantom view in FIG. 5A. This position is also seen in FIG. 1, wherein there is illustrated both holders 46 extending out from the under surface of surface 14, and one of the holders accommodating a cup 52 within the holder as illustrated in FIGS. 1 and 2. This can also be seen in front view in FIG. 5B, as the cup 52 is positioned within space 47 of ring 49, during use. Of course after the drink has been consumed and the cup has been discarded, each of the holders 46 would then be slid in the direction of arrows 54 back into the storage position as illustrated in FIG. 5A.

A more simplified positioning of apparatus 10 is illustrated in FIGS. 4A and 4B. As illustrated in FIG. 4A, apparatus 10 is shown with the tray 14 held in a frame 62 attached via suction cups 30 to the underside 60 of dash board 20, so that tray 12 is totally out of sight as illustrated in FIG. 4B. However, when one would want to use the storage, the tray would be provided with a frame 62, which would accommodate the tray 12 within the frame 62 that has been mounted via suction cups 30 onto the underside of dash board 20. When one would want to use tray 12, the tray could simply be slid outward as illustrated in FIG. 4B, in the direction of arrows 66, and likewise the cup holders 46, as illustrated in FIG. 1 could be positioned on the bottom of tray 12, and slid out likewise as seen in FIG. 4B, in phantom view. Therefore, rather than attach tray 12 upon the dash board and to the windshield 22, tray 12 could either be permanently mounted or mounted via suction cups 30 onto the underside of the dash board, and when in the storage position would be completely out of sight, and when one would have use tray 12, one would slide tray 12 outward, slide cup holders 46 outward, and ready to use tray 12 as illustrated in FIG. 4B.

Figures 3C, 3D:
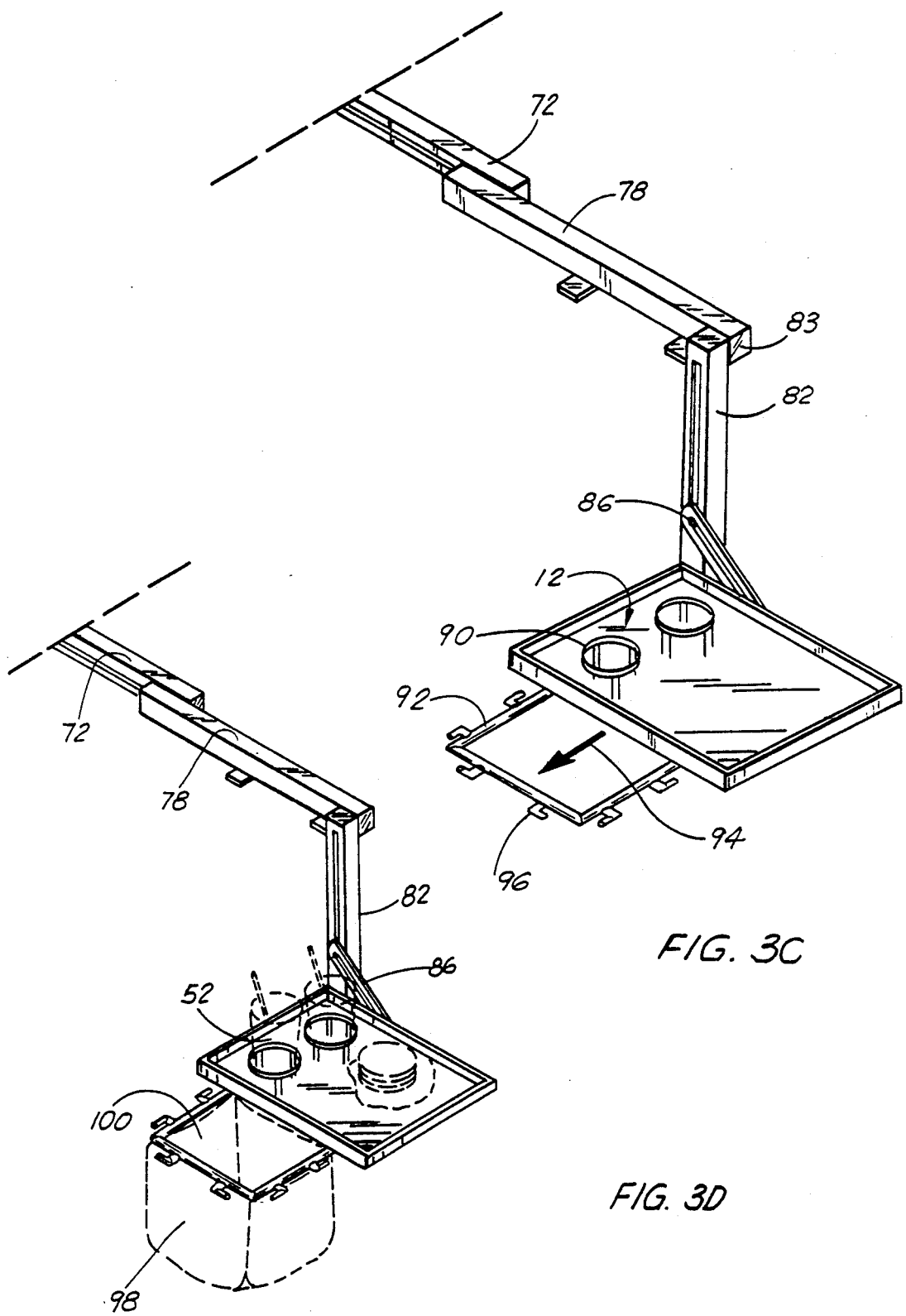

FIGS. 3A-3D illustrate yet an additional embodiment of the apparatus of the present invention that may be utilized in an automobile and stored in an area above the driver, rather than positioned on the dash board as seen in FIGS. 1 and 2, or rather than stored in the storage position as seen in FIGS. 4A and 4B. In this particular embodiment, the tray apparatus 12 would be positioned upon a frame means 70, as seen in FIG. 3A. Frame means 70 would have a first arm member 72 attached to the upper roof portion of an automobile 74, at a first end, and a second end 76 of frame member 72, slidably engaged to a second frame member 78, which would have the ability to slide forward when the frame is to be placed in use in the direction of arrow 80 as seen in FIG. 3A. First arm member 72 if fixedly secured to the upper interior roof portion of an automobile 74, substantially above the driver of the automobile, using any suitable means.

Once the second frame member 78 has been slid into the extended position as seen in FIG. 3A, a third arm 82, rotatingly engaged at its first end to the end 82 of 78, and rotatingly engaged at its second end 85 to tray member 12, would therefore allow tray 12 to rotate in the direction of Arrow 84, as seen in FIG. 3B. Following the rotation of tray 12 in the direction of Arrow 84, as it is attached to member 82, tray 12 would then be held in the horizontal position as seen in FIG. 3C, via a bracket member 86 so that the tray would be supported substantially at a level adjacent the lap of the driver, as seen in FIG. 3D. First arm 72 and second arm 78 would remain in the horizontal support position, yet third arm 82, which is rotatingly engaged to the end 83 of member 78 is extending vertically downward a distance so that tray 12 has been moved to the horizontal position as seen in FIG. 3C. This position would be very accommodating to a driver or passenger of the car. Again tray 12 would be supported via a support bolt through the end of member, 82, and would be held in place via bracket member 86 as illustrated in FIG. 3C.

Tray 12, as illustrated, would be further adapted with a particular of cup or bottle holder means 90 as illustrated 3C and would be further accommodated with a means a trash bag to dump trash thereinto after use. Turning now to the trash bag holder, reference is made to FIGS. 3C and 3D whereas there is illustrated a frame member; 92, which has been slidably extended outward from its storage position (see FIG. 3A) beneath surface of tray 12, and after tray 12 has been positioned as illustrated in 3C, frame 92 would be slid out in the direction of arrow 94, with U-shaped frame 92 having a plurality of L-shaped members 96, around the perimeter of frame 92, for attaching a trash bag 98 as seen in phantom view in FIG. 3D. Therefore, trash which would be accumulated during eating and such could be thrown into the interior 100 of trash bag 98. When one is completed, the bag could simply be removed and discarded. Therefore, it would enable the driver of the passengers to have the benefit of a trash collector within the bag adjacent the fluid holding tray as seen in FIG. 3D.

The improved means 90 for holding the cup or bottle onto the tray 12 is illustrated in FIGS. 6A-6C. The holder shown in FIG. 6A would comprise a base member 102 which would be circular in cross-section, and having three equally spaced apart clip holders 104 that will be discussed further. Each clip holder 104 would accommodate a vertically extending lower clip portion 106, which has a pair of parallel leg portions 108, with the lower end of clip member 106 attached to the clip holders 104, and the upper portion of clip member 106 attached to the lower end of an upper clip 110. Clip 110 would as seen in FIG. 6B, would likewise have a pair of leg portions 108, and would be hingedly engaged to lower clip member 106, via a U-shaped lower portion 112. The pair of side legs 108 would engage a clip portion 114 of lower member 106, so that when the clips are extended vertically as seen in FIG. 6A, the clips would be engaged as support legs for an upper ring member 116 as seen in FIG. 6A.

While in this position, as illustrated in FIG. 3D, a cup member or the like could be placed within the interior hollow 114 of upper ring 112, and the base of a cup member 52 would be resting upon surface 103 of base 102.

FIG. 6C illustrates the positioning of the storage of the cup holder while the tray is in storage. As illustrated, each of the clip means 114 which engage the leg members 110 and 106 of the upper and lower clips, would be disengaged, and would hingedly fold inwardly towards the center of the base 102 as seen in FIG. 6C, and therefore upper ring member 116 would collapse downward and would lay substantially flush against the upper surface 103 of base 102. In this position therefore as tray 12 would be placed in the storage position from whence it came as was seen in FIG. 3A, the collapsibility of the holder would then allow the holder to be stored in a confined area with tray 12. Yet when the tray 12 was in the use position as seen in FIG. 3D, then the holders could simply be extended upwardly and snapped into the locked position of FIG. 6A, to support a soft drink, bottle or cup and to avoid spillage of the drink while in use.

It is foreseen that although the preferred embodiment is positioned above the drive as illustrated in FIGS. 1-3, and an additional embodiment is illustrated in FIGS. 4A and 4B as being positioned under the dashboard, it is foreseen that an automobile manufacturer may choose to position the slidably tray 12 within the dashboard, so that the tray may simply be pulled out of the face of the dashboard for use, and after use, slidingly returned to the dashboard so that its forward edge may remain flush with the dashboard and would simply be affixed within it. Therefore, in the original construction of the automobile that could be accommodated for as desired.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for supporting materials on a flat surface within the interior of a vehicle, the apparatus comprising:
    a) a first arm member adapted to be fixedly secured to the upper interior roof of the vehicle substantially above the driver of the vehicle;
    b) a second arm member slidably movable in relation to the first arm member;
    c) a third arm member rotatingly attached to the second arm member, and which rotates from a first position parallel to the second arm member, to a second position extending vertically downward from the second arm member;
    d) a tray attached to the third arm member, the tray rotatably movable in relation to the third arm member, and supported in the horizontal position while the third arm member is supported vertically, the tray adapted to be supported substantially at a level adjacent the lap of the driver;
    e) trash bag support means, further comprising a U-shaped bracket member slidably movable in relation to a lower surface of the tray, and including a plurality of brackets for supporting a trash bag thereupon, so that the trash bag is maintained in the open position; and
    f) means secured onto the upper surface of the tray for supporting at least a raised holder for receiving a cup thereinto to maintain the cup in the vertically supported position on the tray.

2. The apparatus of claim 1, wherein a tray is supported in the horizontal position from the third arm via a support bracket extending from the surface of the tray onto the third arm member.

3. The apparatus of claim 1, wherein the cup support means further includes a base portion secured to an upper surface of the tray, and an upper ring portion, attached to the base portion via a plurality of collapsible leg members, so that in a collapsed position the upper ring member is positioned substantially flush against the base portion, and in the support position the ring member is extended upward when the leg members are in a locked fixed support position.

* * * * *